Jan. 5, 1926. 1,568,830
H. GUNDERSON
WASTE OIL PAN
Filed August 1, 1924
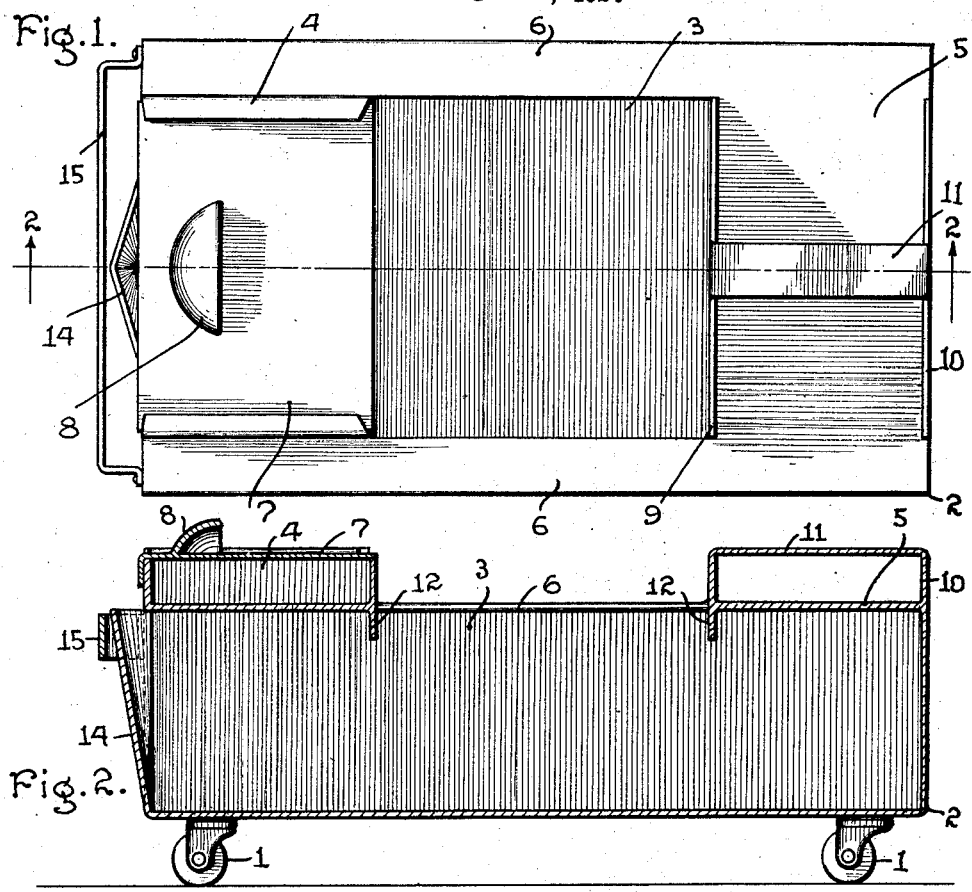
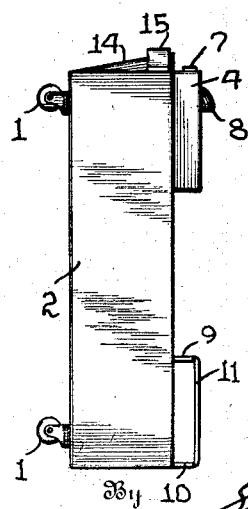
Inventor:
Herbert Gunderson.

Patented Jan. 5, 1926.

1,568,830

UNITED STATES PATENT OFFICE.

HERBERT GUNDERSON, OF STANLEY, WISCONSIN.

WASTE-OIL PAN.

Application filed August 1, 1924. Serial No. 729,600.

*To all whom it may concern:*

Be it known that HERBERT GUNDERSON, a citizen of the United States of America, residing at Stanley, in the county of Chippewa and State of Wisconsin, has invented new and useful Improvements in Waste-Oil Pans, of which the following is a specification.

The purpose of the invention is to provide a receptacle particularly adapted for catching oil drained from the crank cases of the engines of motor vehicles, to so equip it that it may be easily moved into position under the drain plug, and to arrange the construction so that the device may be carried by an appropriate handle or bail as a bucket to a point where the waste oil may be appropriately discharged.

An incidental purpose of the invention is to so arrange the construction that provision may be made for carrying tools and other devices that may be necessary in working underneath a car.

With these objects in view, the invention consists in the construction and combination of parts of which a preferred embodiment is illustrated in the accompanying drawings, wherein:

Figure 1 is a plan view of the invention.

Figure 2 is a longitudinal sectional view.

Figure 3 is a detail elevational view showing the position of the device so that it may be readily transported to convey the waste oil to the point of discharge.

Supported on the caster rollers 1 is the pan or receptacle 2 which is made preferably of sheet metal, the top being open, as at 3, but closed at either end, as indicated respectively at 4 and 5, the former closure spanning the flanges 6 bounding the side edges of the pan and having its bottom in the plane of said flanges and being itself provided with a cover slide 7 to provide a receptacle for small tools or parts and the like, the slide having a grab or finger hold 8 to permit its being withdrawn to open the receptacle. The closure member 5 is in the form of a shelf flanged, as at 9 and 10, with the flanges extending transversely of the pan and being spanned by a handle 11. Long tools, such as screw-drivers and the like, may be carried on the shelf and the handle 11 retains them in position thereon in the upright position of the pan as the same is being carried in such position.

The receptacle 4 and shelf 5 constitute guards at the open side of the pan in either of its two upright positions. The inner flange 9 of the shelf and the adjacent wall of the receptacle 4 which is extended below the flanges 6 to provide a depending flange 12 serve respectively to prevent splashing of the oil out of the receptacle when the latter is being carried in the position shown in Figure 3 or when the latter is being emptied, the emptying position being the reverse of that shown in Figure 3, when the contents of the pan may flow from the latter through the discharge spout 14 which is spanned by a transverse handle 15 secured on the end of the pan and secured preferably at an intermediate point with the discharge mouth.

The device is susceptible of being readily carried in a horizontal position by means of the handles 15 and 11, or in a vertical position with the handle 15 constituting the supporting means or in the reverse or emptying position with the handle 11 constituting the supporting means.

The invention having been described, what is claimed as new and useful is:

1. A device for the purpose indicated, comprising a pan having a guard wall on its top side near one end and provided with a central opening, the opposite transverse edge portions of said wall having upstanding flanges between which any suitable tools may be disposed, resting upon the guard wall, and a handle member connecting the upstanding guard flanges, the handle acting as means to prevent displacement of said tools.

2. A device for the purpose indicated comprising a waste oil pan provided with an open compartment on its top side at one end consisting of transverse walls with a handle connecting the walls and a closed compartment on the top side at the opposite end, the closed compartment having a slide cover and a handle on said cover, the top side of the pan having an opening between the two compartments with splash preventing flanges depending inwardly of the pan at opposite ends of the central opening.

3. A device for the purpose indicated comprising a waste oil pan having an open compartment on its top side at one end consisting of end walls with a handle connecting said end walls, and a closed compartment on the top side at the opposite end thereof, the top side of the pan having a central opening intermediate the two compartments, the adjacent ends of both compartments having spash flanges depending inwardly of the interior of the waste oil pan at opposite ends of the central opening.

In testimony whereof he affixes his signature.

HERBERT GUNDERSON.